United States Patent Office 2,983,253
Patented May 9, 1961

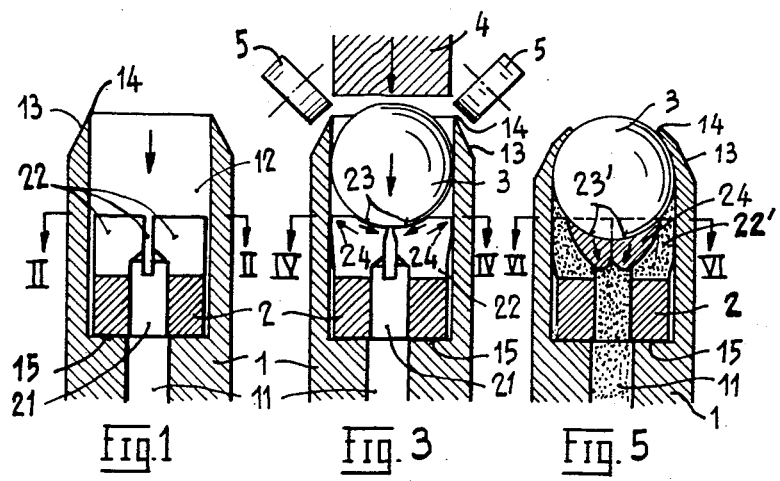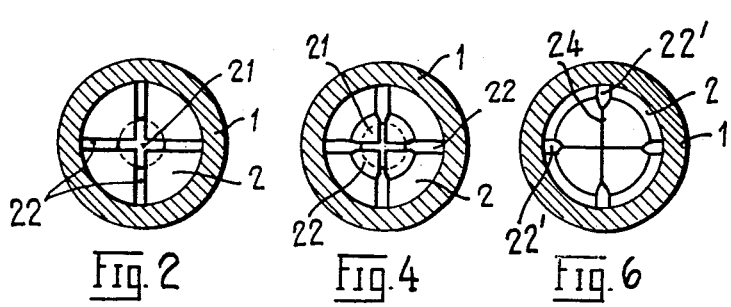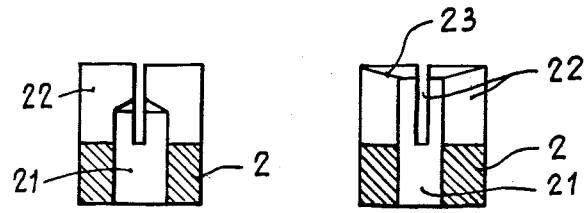

2,983,253
WRITING TIPS FOR BALL POINT PENS
Ernst Johan Jens Henriksen, 1 Alpenstrasse, Lucerne, Switzerland
Filed June 18, 1957, Ser. No. 666,433
1 Claim. (Cl. 120—42.4)

This invention relates to ball point pens, and more particularly to the writing tip in which the ball is rotatably mounted on a part-spherical seating, and to methods of making the same.

It is an object of the invention to provide a writing tip for a ball point pen which can readily be produced by mass production methods and, at the same time, enables the ball to be rotatably mounted with the high degree of precision which is necessary in such pens.

According to the invention the part-spherical seating surface on which the ball is rotatably mounted is formed in a separate insert after the insert has been disposed in the tip element. Alternatively, the seating surface may be partly formed in the insert before the insert is placed in the tip element and its formation completed after the disposal of the insert in the tip element.

The insert may suitably consist of a cylindrical member which is disposed in a wider bore at one end of a tubular part and is formed with an ink feeding passage, or passages, communicating with the interior of the tubular part and with the seating surface for the ball. The feeding passages may consist of a central axial bore which extends partly or completely through the insert and a number of radial slots extending from the seating surface and communicating with the axial bore.

The feeding channels which are provided in the bottom seat are preferably formed before the insert is placed in the bore. In order to simplify the manufacture and assembly of the tip element, the diameter of the insert may be slightly less than the diameter of the bore in which it is disposed, in which case the clearance between the outer periphery of the insert and the inner periphery of the bore should preferably be between 0.01 and 0.05 mm. If the diameter of the insert is less than the diameter of the bore, the insert is expanded either by pressing the ball into the insert or in a preceding operation.

A tip element according to the invention is illustrated, by way of example, in the accompanying drawing, in which:

Fig. 1 is a cross-section through the tip element showing the insert disposed in the bore;

Fig. 2 is a cross-section on the line II—II of Fig. 1;

Fig. 3 is a cross-section similar to Fig. 1 showing the ball partly pressed into the insert;

Fig. 4 is a cross-section on the line IV—IV of Fig. 3 with the ball removed;

Fig. 5 is a view similar to Figs. 1 and 3 showing the ball mounted in the tip element and ready for use;

Fig. 6 is a cross-section on the line IV—IV of Fig. 5 but with the ball removed;

Fig. 7 is a detail view of the insert in Fig. 1; and

Fig. 8 is a detail view of a slightly modified form of insert.

Referring to Figs. 1-6, the tip element comprises a tubular part 1 having an ink feeding conduit 11 which is widened out at its front end by a bore 12 to form a shoulder 15 in which an insert 2, which is of slightly smaller diameter than the bore, is positioned. The insert 2 has an ink feeding channel 21 which is aligned with the ink feeding conduit 11 and extends only partly through the insert. The upper end (in Fig. 1) of the insert is provided with radial slots 22 which intersect in the center of the insert and extend down into the bore 21, so as to afford a passage for the ink from the feeding conduit 11 to the ball.

As shown in Figs. 3 and 4, the ball 3 is placed in the bore 12 and is pressed in the direction of the arrows into the insert 2 by means of a pressure punch 4. As the ball is pressed into the insert, the marginal portions of the insert are expanded outwardly as indicated by the arrows 24, so that the insert is firmly positioned in the bore 12 of the tip 1. At the same time the edges of the slots 22 are forced inwardly within the range of the spherical seating surface 23 which is formed as the ball is pressed into the insert, as shown in Fig. 4.

Pressure on the ball is continued until it is in the position shown in Fig. 5, when the lip 13, 14 of the tip 1 is also pressed into contact with the ball by the spinning tools 5, and the ball is held in position and is rotatable on its seating 23 which accurately conforms to the spherical shape of the ball. The reservoir 11 need then only be filled with ink paste which passes through the bore 21 and the radial slots 22 of the insert and uniformly inks the ball 3.

Figs. 5 and 6 show, how, when the ball has been firmly pressed into the insert, the radial slots 24 are completely closed over the area of the spherical seating surface 23 but remain open at the circumferential portions 22' which are in communication with the bore 21 and the ink reservoir 11.

Fig. 7 shows the insert of Fig. 1 in which the central bore 21 does not extend right through the insert but stops at a distance from the upper end. The radial slots are then sufficiently deep to communicate with the bore in order to provide a feed passage for the ink.

Fig. 8 shows a modified form of insert in which the bore 21 extends completely through the insert and in opposition the end face 23 of the insert is preformed to some extent before the insert is placed in the bore of the tip element, so that only a slightly deformation is necessary in order to form the seat for the ball after the insert has been positioned in the tip element.

The feeding channels may be formed by axial grooves in the outer periphery of the insert in which case the central bore in the insert can be completely omitted if the grooves are cut deep enough to communicate directly with the feeding conduit 11.

The length of the insert is preferably about one and one-half times its diameter.

The insert may be made of the same material as that of which the tip portion is made, but it may also be made of a different material, for example a material having a greater resistance to wear, of a material which offers less friction to the movement of the ball. Preferred materials are, for example, an alloy containing 920–935 parts per thousand of silver, the rest being copper or, alternatively, of nickel silver, for example 60% copper, 20% zinc and 20% nickel. Another material which is suitable is aluminum bronze, for example, a copper alloy containing from 5–10% aluminum.

I claim:

A tip element for a ball point pen, comprising; a tip member having an axial bore therethrough, an enlarged counterbore at the outer end of said member defining an outwardly facing annular shoulder at the bottom thereof, a ball seat element in said counterbore comprising a generally cylindrical insert in said counterbore and seated on said shoulder, said insert having a central passage extending from the inner end thereof toward but short of the outer end of said insert and communicating at its inner end with said axial bore, said insert also having a plurality of passages communicating with the outer end of said central passage and diverging outwardly therefrom through the outer end of said insert at the lateral periphery thereof, the central portion of the outer end of said insert defining a spherical seat for a ball with said passageways opening therethrough, the inner end portion of said insert being of less diameter than said counterbore and the outer end portion thereof bulging laterally into tight frictional engagement with the sides of said counterbore.

References Cited in the file of this patent

UNITED STATES PATENTS

| | | |
|---|---|---|
| 2,536,124 | Bolvin et al. | Jan. 2, 1951 |
| 2,551,490 | Ferst et al. | May 1, 1951 |
| 2,646,761 | Knobel | July 28, 1953 |
| 2,718,051 | Cloutier | Sept. 20, 1955 |
| 2,847,975 | Lawton | Aug. 19, 1958 |

FOREIGN PATENTS

| | | |
|---|---|---|
| 218,660 | Switzerland | Apr. 1, 1942 |
| 894,857 | France | Mar. 20, 1944 |
| 435,349 | Italy | Sept. 11, 1947 |
| 613,408 | Great Britain | Nov. 29, 1948 |
| 660,784 | Great Britain | Nov. 14, 1951 |
| 827,909 | Germany | Jan. 14, 1952 |
| 691,469 | Great Britain | May 13, 1953 |
| 712,938 | Great Britain | Aug. 4, 1954 |
| 1,108,400 | France | Aug. 31, 1955 |
| 66,053 | France | Jan. 16, 1956 |